Feb. 29, 1944.    E. A. STANLEY    2,342,981
INSURANCE POLICY
Filed Nov. 3, 1942
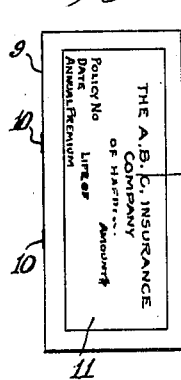
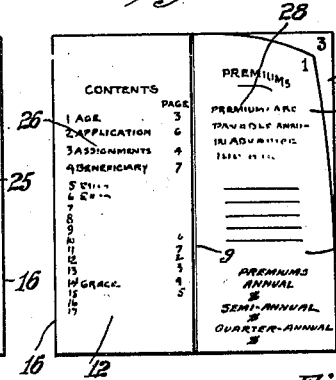
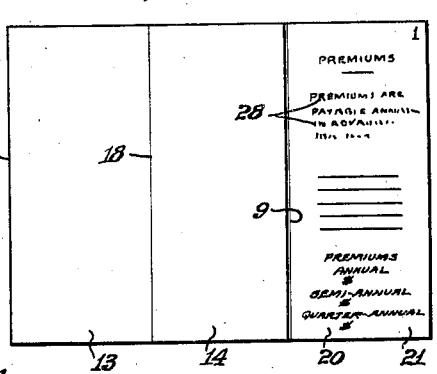
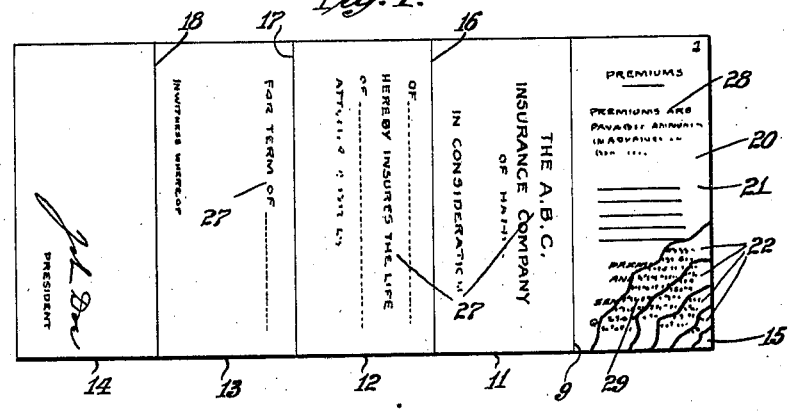
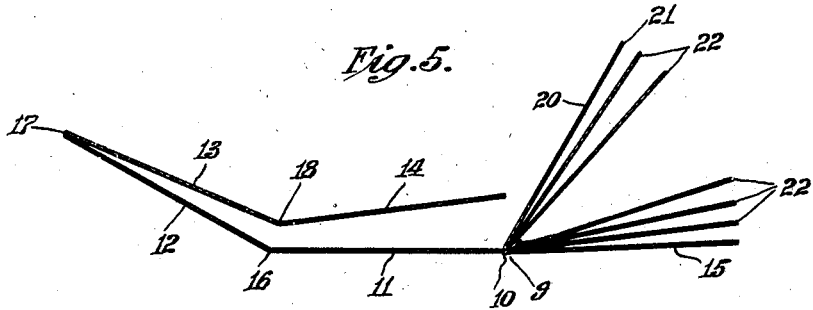
INVENTOR;
Edmund A. Stanley
BY
Morrison, Kennedy & Campbell
ATTORNEYS.

Patented Feb. 29, 1944

2,342,981

UNITED STATES PATENT OFFICE 2,342,981

INSURANCE POLICY

Edmund A. Stanley, South Orange, N. J., assignor to Bowne & Co., Inc., New York, N. Y., a corporation of New York Application November 3, 1942, Serial No. 464,335

2 Claims. (Cl. 283—54)

This invention is a novel form and construction of insurance policy, being a printed document, exemplified by a policy of life insurance or fire insurance wherein is embodied the insurance contract, usually of short form, together with a multitude of appended clauses setting forth various terms, details and modifications, and constituting a part of the contract by reference.

The conventional insurance policy possesses certain salient objections. It ordinarily consists of a sheet of foolscap, which in reality is a double sheet, hinged at the top, and the doubled sheet being of legal size and shape, as about 13 inches in height by 8 inches in width, as folded. Such an insurance document carries at its uppermost face, or the top face of the top page, the insurance contract, in short form but often with riders pasted thereon; while the supplementing and modifying clauses are conventionally printed in upside down fashion on the second or back page of the top sheet, and sometimes carried over to the third page or top face of the second or under sheet. By the customary legal folding, this double document is first folded upwardly about a middle crease, and then again upwardly affording a policy which may be turned at right angles to present a tall oblong document carrying in a back endorsement the name of the insurer, and the insured, and a general description with details as to principal, premium and the like. Such a document is so notoriously difficult to read, principally on account of the inverted arrangement of the attached clauses, the necessary fine printing thereof, and the presence of numerous creases, that the inconvenience of the insured is known frequently to lead to the nonperusal of the terms.

The general object of the present invention is to overcome such objections and to afford an insurance policy of a novel construction and rearrangement such as to present a document of high convenience in preparing and perusing, and with ample space and provision for printing all clauses, terms and details in type of easy legibility and with quick and simple access to all parts thereof. Other objects and advantages will be made to appear in the hereinafter following description of an illustrative embodiment explaining the invention or will be understood by those conversant with the subject matter.

To these ends, the printed insurance policy of this invention, as an article of manufacture, is one presenting a tall-oblong shape when closed, and which in its construction embodies the following features in unitary combination. In its general elements the article consists of an enclosing cover portion and an openable but normally closed leaf-pack or booklet portion contained within the cover portion, and said two portions being mutually connected and bound together along an upright general hinge line. Of these unified elements, the leaf-pack consists of a plural number of leaves printed with various insurance clauses stating various customary provisions and modifying terms of the policy, and secured together in book-like manner so as to open about such hinge line. As to the cover portion this comprises a front cover sheet which consists of a plural number of panels, three or four being preferred, foldable upon each other about crease lines which are parallel to the general hinge line, so that these panels may be infolded to reduce the cover sheets to substantially the size and shape of the closed leaf-pack, so that when fully closed the policy is of the usual tall-oblong shape. The front cover sheet carries printed matter both at its inner and outer faces, including, at the outer face of one panel, adjacent to the hinge line the endorsed general description of the policy, preferably in a conventional manner. At the next adjacent outer panel is preferably provided an index of the contents of the booklet, its various clauses and other provisions. The description is completed by stating that upon the inner face of the cover sheet, of substantially legal size when unfolded, is spread the insurance contract, as of conventional character and form, with names of the parties, date, signature, etc., readily examined by opening the cover sheet at length.

In the appended drawing an illustrative embodiment is disclosed. Fig. 1 is an exterior face or elevation view of the insurance policy of this invention in its fully closed position.

Fig. 2 is a similar view with the front cover sheet unfolded to the extent of one panel, thus disclosing the leaf-pack, one leaf of which is shown swung up to disclose the next lower leaf.

Fig. 3 is a similar face view with the cover sheet twice unfolded.

Fig. 4 is a similar view with the cover sheet fully unfolded, the same having four panels to the left of the general hinge line.

To show better the relative arrangement Fig. 5 is a horizontal section view taken, for illustration, on Fig. 3, with the cover sheet partly opened and the leaf-pack also partly opened up.

Referring to the structure as shown in the drawing, the cover sheet and the leaf-pack are interconnected about a main hinge line 9, for example by wire staples 10 or by adhesive.

The cover sheet consists of the following parts or panels 11 to 15. The first panel 11, adjacent to the hinge line, carries at its outer face the general endorsement already referred to, and shown in Fig. 1. The second panel 12 at its outer face preferably carries an index of contents, as indicated in Fig. 2. The third and fourth panels 13 and 14 may be blank at their outer faces. Beyond the hinge the cover portion preferably includes a back cover or panel 15.

These several parts of the cover portion are foldable about the main hinge 9 and about three prearranged creases 16, 17 and 18, between the first, second, third and fourth panels respectively; so that the front cover sheet conveniently folds inwardly into its intended closed position.

Referring next to the contained booklet or leaf-pack this may contain an even number of leaves, as shown, each leaf having a front page and a back page, and all connected in book-like manner, with a sufficient number of leaves to provide for all possibly desired clauses, provisions and modifications. Thus, in Fig. 2, is shown the first page 20 of the leaf-pack, being the top page of the first leaf 21 thereof, and beyond such first leaf are indicated a number of additional booklet leaves 22, which may be in any desired number.

The insurance policy construction thus described may carry, at its various portions, printed matter such as already referred to. For example at the outer face of the first panel 11 may be printed the endorsement or general description 25, shown in Fig. 1. Upon the second panel 12 in Fig. 2 is indicated the general index or contents 26. The third and fourth panels 13 and 15 are shown blank at their outer faces, as seen in Fig. 3, but may carry convenient printed matter. The four panels combined, at the inner face thereof, provide the space for the insurance contract 27, as shown in Fig. 4, spread across the four panels, collectively of substantially legal size.

The printing of the attached clauses and the like, on the pages of the booklet or leaf-pack is indicated in a general way in Figs. 2, 3 and 4, where the provisions 28 as to premiums are provided on page 1 of the booklet, and other printed matter 29 at pages 2, etc.; all digested or indexed in the list of contents 26 at the outer face of the second panel 12.

From this description it will be seen that the stated objects of the invention have been attained. The main contract is readily inspected and then may be concealed by the partial infolding of the cover sheet, in the manner shown in Fig. 2, so that the policy may be made use of in this adjustment, the index appearing at the left side of the partially opened policy, and the respective pages of the leaf-pack being printed with the detail clauses and provisions as already mentioned. The index and the pages of clauses are handled with maximum convenience, resembling to a great extent the examination of any book of reference, with the contents conveniently facing the user while turning the leaves of the booklet to examine the various clauses and modifications that are printed in amply large type throughout the leaf-pack; and which clauses may be selectively included or cancelled out of the policy at the time of issuing it, under the particular terms of the agreement that may be made between the insurer and the insured.

I claim:

1. As an article of manufacture, a foldable insurance policy of flat thinness and upright tall oblong shape when folded, and having a structure comprising in unitary combination a foldable cover portion and a closable leaf-pack portion, said two portions being mutually bound together flatly and permanently, along a common upright hinge line; said leaf-pack consisting of a group of oblong paper leaves upon which are borne various conventional clauses of insurance provisions and terms auxiliary to the insurance contract and said leaves being secured together in flat booklike manner to open freely about such upright common hinge line for quick access to its contents; and said cover portion consisting of an extended paper sheet having at the front side of the policy an uninterrupted series of at least three oblong panels of continuous integral paper material foldable upon each other about crease lines parallel to such common hinge line, whereby the panels may be folded in to reduce the cover sheet substantially to the size and shape of the closed leaf-pack so that the fully closed policy is of such upright oblong shape; and the cover sheet bearing, spread upon its multiple-panel uninterrupted inner face, for inspection by opening at length, the contract of insurance; and said cover sheet bearing upon one exposed panel of its outer face a general descriptive endorsement and upon another outer panel an index of the clauses borne on the pages of the leaf-pack; thereby permitting ready location, examination and study of policy and contents.

2. The insurance policy of claim 1, wherein the cover sheet is also extended from the front beyond the common upright hinge line as an integral back cover panel adjacent to such hinge line, one of the two cover sheet panels adjacent to such hinge line bearing the aforesaid general descriptive endorsement of the policy.

EDMUND A. STANLEY.